(12) United States Patent
Patzer et al.

(10) Patent No.: US 7,742,760 B2
(45) Date of Patent: Jun. 22, 2010

(54) DYNAMIC MOBILE STATION CONFIGURATION IN WIRELESS COMMUNICATIONS SYSTEMS AND METHODS THEREFOR

(75) Inventors: Robert Patzer, Lake Zurich, IL (US); Rodney Landers, Grayslake, IL (US); Mark Pecen, Palatine, IL (US); Arnold Sheynman, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 124 days.

(21) Appl. No.: 11/851,546

(22) Filed: Sep. 7, 2007

(65) Prior Publication Data
US 2007/0298775 A1    Dec. 27, 2007

Related U.S. Application Data

(62) Division of application No. 10/156,250, filed on May 28, 2002, now Pat. No. 7,269,414.

(51) Int. Cl.
*H04M 3/00* (2006.01)
(52) U.S. Cl. .................. 455/419; 455/418; 455/420
(58) Field of Classification Search ......... 455/418, 455/419, 420, 422.1, 426.1
See application file for complete search history.

(56) References Cited

U.S. PATENT DOCUMENTS

| | | | | |
|---|---|---|---|---|
| 5,659,596 | A * | 8/1997 | Dunn | 455/456.1 |
| 6,208,871 | B1 | 3/2001 | Hall | |
| 6,229,998 | B1 * | 5/2001 | Hamdy et al. | 455/226.1 |
| 6,351,639 | B1 | 2/2002 | Motohashi | |
| 6,381,464 | B1 * | 4/2002 | Vannucci | 455/456.1 |
| 6,393,254 | B1 * | 5/2002 | Pousada Carballo et al. | 455/1 |
| 6,490,455 | B1 * | 12/2002 | Park et al. | 455/456.4 |
| 6,496,551 | B1 | 12/2002 | Dam | |
| 6,505,043 | B1 | 1/2003 | Aihara | |
| 6,643,517 | B1 * | 11/2003 | Steer | 455/456.4 |
| 6,704,557 | B1 * | 3/2004 | Krishnamurthy et al. | 455/278.1 |
| 6,975,604 | B1 | 12/2005 | Ishida et al. | |
| 6,975,666 | B2 * | 12/2005 | Affes et al. | 375/130 |

(Continued)

FOREIGN PATENT DOCUMENTS

JP    2000050353 A    2/2000

(Continued)

OTHER PUBLICATIONS

Camped on a Cell; 3GPP TR 21.905 V5.3.0 (Mar. 2002). Release 5, p. 8.

(Continued)

*Primary Examiner*—Joseph H Feild
*Assistant Examiner*—Huy D Nguyen
(74) *Attorney, Agent, or Firm*—Roland K. Bowler, II

(57) ABSTRACT

A cellular communications network including a base station subsystem (110) including a base station controller communicably coupled to a plurality of base stations (112), a user accessible mobile wireless communications device configuration control server (140) coupled to the base station subsystem (110), an network broadcast transmitting assisting base station (130), which may be coupled to the user accessible mobile wireless communications device configuration control server or to the base station subsystem. A mobile station is configured with configuration information associated with the assisting base station when the mobile station monitors the assisting base station.

7 Claims, 5 Drawing Sheets

U.S. PATENT DOCUMENTS

| | | | |
|---|---|---|---|
| 2001/0004604 A1* | 6/2001 | Toshimitsu et al. | ......... 455/562 |
| 2002/0051438 A1 | 5/2002 | Yano et al. | |
| 2002/0151308 A1 | 10/2002 | Baba | |
| 2002/0198000 A1 | 12/2002 | Voyer | |
| 2003/0165127 A1 | 9/2003 | Fujiwara et al. | |

FOREIGN PATENT DOCUMENTS

| | | | |
|---|---|---|---|
| JP | 2000333232 A | 11/2000 | |
| JP | 2001036964 A | 2/2001 | |
| JP | 2001506442 A | 5/2001 | |
| JP | 2002101158 A | 5/2002 | |
| WO | 9510921 A1 | 4/1995 | |
| WO | 9827779 A1 | 6/1998 | |

OTHER PUBLICATIONS

Radiocommunication Act; Industry Canada, Mar. 9, 2001, 5 Pages.

Restaurants Pull Plug on Cell Phones; Jake Batsell; Aug. 25, 1999, 4 Pages.

Canada Tackles Cell Phone Jamming Controversy; Jay Wrolstad; Mar. 13, 2001, 4 Pages.

Cellphone Solution in Search of a Champion, Bruce Tognazzini; May 2000, 2 Pages And Jamming Technology—Implementation & Use; Starport; Apr. 25, 2002, 3 Pages.

Be Sensible; Cingular Wireless; May 23, 2001, 2 Pages.

Japanese Language Office Action dated Dec. 24, 2008; Japanese Patent Application No. 2004-510143; (translation included).

3GPP TS 05.08 v8.12.0 (Nov. 2001); 3rd Generation Partnership Project; Technical Specification Group GSM/EDGE; Radio Access Network; Radio Subsystem Link Control (Release 1999).

3GPP TS 24.008 v3.10.0 (Dec. 2001); 3rd Generation Partnership Project; Technical Specification Group Core Network; Mobile Radio Interface Layer 3 Specification; Core Network Protocols - Stage 3 (Release 1999).

* cited by examiner

WELCOME TO THE ALERT CONTROL CENTER

ADDRESS http://www......com

NAME:
ESTABLISHMENT NAME:
STREET ADDRESS:
CITY/STATE/ZIP:
EMAIL:
} 510

ENTER DATE WHEN PHONE WILL VIBRATE BUT NOT RING } 520

SELECT DISTANCE IN METERS FROM LOCATION THAT PHONE WILL VIBRATE BUT NOT RING
[20] [50] [100] } 540

ENTER TIME INTERVAL WHEN PHONE WILL VIBRATE BUT NOT RING
FROM: [7PM] TO: [11PM] } 530

[SUBMIT]

500

US 7,742,760 B2

DYNAMIC MOBILE STATION CONFIGURATION IN WIRELESS COMMUNICATIONS SYSTEMS AND METHODS THEREFOR

CROSS REFERENCE TO RELATED APPLICATIONS

The present application is a division of copending and commonly assigned U.S. application Ser. No. 10/156,250 filed on 28 May 2002, now U.S. Pat. No. 7,269,414, from which benefits under 35 USC 120 are hereby claimed.

FIELD OF THE DISCLOSURE

The present disclosure relates generally to wireless communications, and more particularly to wireless communications devices, network infrastructure and methods for dynamically changing the configuration of mobile wireless communications devices based upon network broadcast information.

BACKGROUND

The global proliferation of mobile wireless telephone handset usage has given rise to increased environmental noise levels, resulting from audible alert tones and conversational chatter, which is often distracting and increasingly unwelcome in many places, for example, in libraries, educational classrooms, places of worship, offices, television studios, theaters and concert halls, court rooms and other government buildings, etc.

Cellular telephone use is banned or restricted in many environments, including restaurants, government buildings, commercial aircraft, hospitals and other areas, due either to environmental noise or potential radio frequency interference concerns. Compliance with these restrictions however is generally voluntary. The user must manually disable the phone or reduce the audio alert volume or configure the phone to vibrate instead of ring, usually through a user setup menu or by selecting a particular user profile.

The Canadian Government recently issued a "Radiocommunications Act", Notice No. DGTP-002-02, inviting industry and public comment on a proposal to broaden the licensing of radiotelephone jamming devices for niche-market and location-specific purposes, beyond public safety and law enforcement applications.

Several radio jamming technologies are known, including the use of intelligent beacons that disable cellular telephone ring features by transmitting a control signal, for example from a Bluetooth transmitter to a Bluetooth enabled microchip on the cellular telephone.

U.S. Pat. No. 6,351,639 entitled "Telephone Whose Setting Details Can Be Changed, And Telephone Capable of Changing Settings Of Called Telephone" discloses remotely controlling cellular telephone settings, for example ring volume and alert mode, from another cellular telephone or from a landline phone. In U.S. Pat. No. 6,351,639, the user of the telephone having its setting changed, however, has the ability to limit or reject new settings from remote telephones.

The various aspects, features and advantages of the present disclosure will become more fully apparent to those having ordinary skill in the art upon careful consideration of the following Detailed Description of the Disclosure with the accompanying drawings described below.

DETAILED DESCRIPTION

The disclosures relate to methods and enabling architectures for dynamically controlling wireless mobile communications devices, or mobile stations, operating configurations based upon network broadcast information, infrastructure for transmitting network broadcast information, and methods in mobile wireless communications devices for configuring the devices based upon network broadcast messages.

Figure 1:
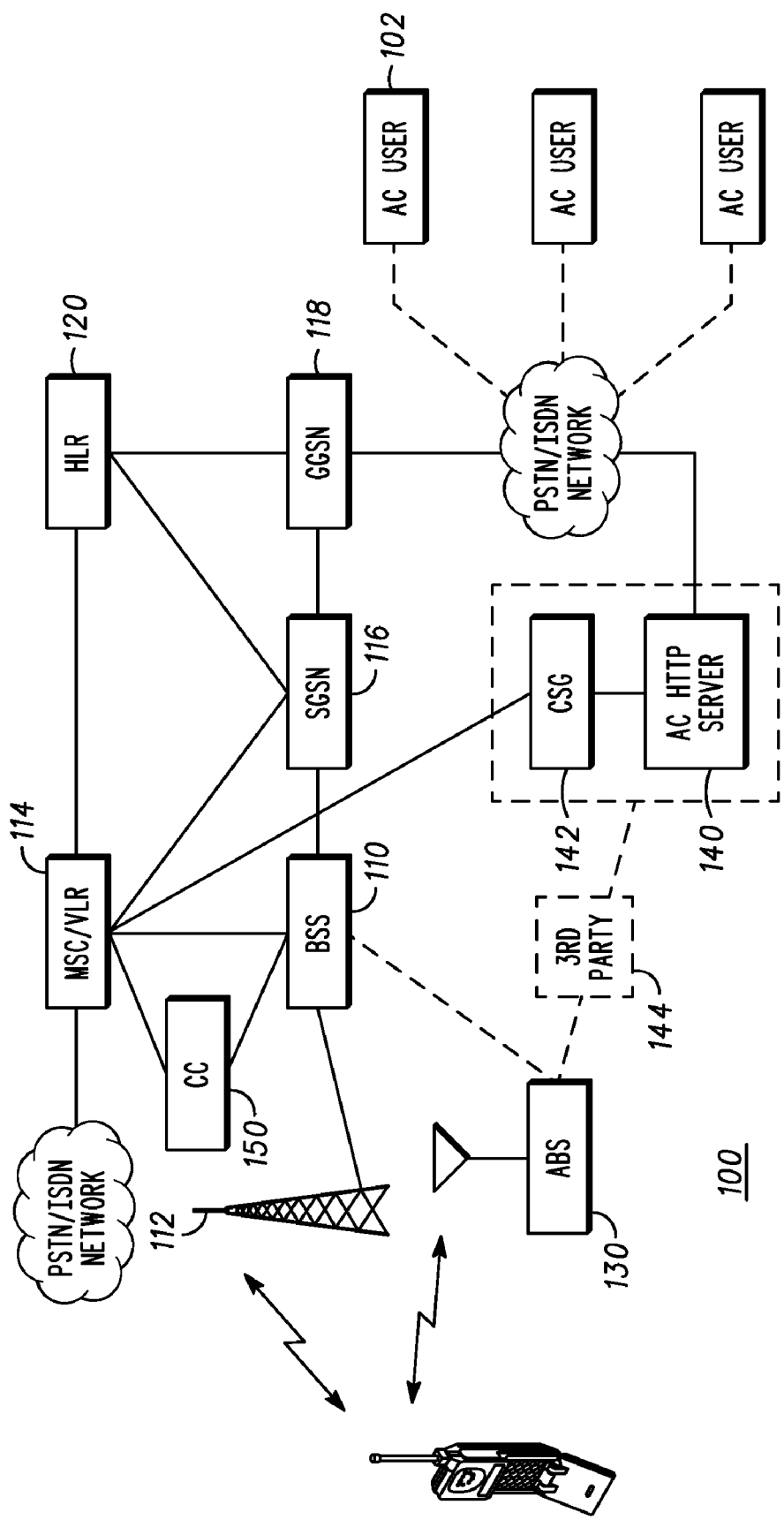
FIG. 1 is an exemplary communications network having a mobile wireless communications device configuring base station.

In FIG. 1, the exemplary GSM network 100 comprises generally a base station system (BSS) 110 having a base station controller in communication with base station transmitters. Only one base station, base station 112, is illustrated. The exemplary BSS is coupled to a mobile switching center and visitor location register (MSC/VLR) 114 and to a serving GPRS support node (SGSN) 116. The SGSN 116 is coupled to a gateway GPRS support node (GGSN) 118 and to a home location register (HLR) 120. The MSC/VLR 114 is coupled to the SGSN 116 and to the HLR 120, which is also coupled to the GGSN 118, as illustrated in FIG. 1.

Although the exemplary network embodiment is based upon the Global System for Mobile Communication (GSM) and Universal Mobile Telecommunications System (UMTS) mechanism, the disclosures also apply to other networks, for example, TDMA and W-CDMA wireless communications networks, among others, as will be apparent to those of ordinary skill in the art.

Figure 2:
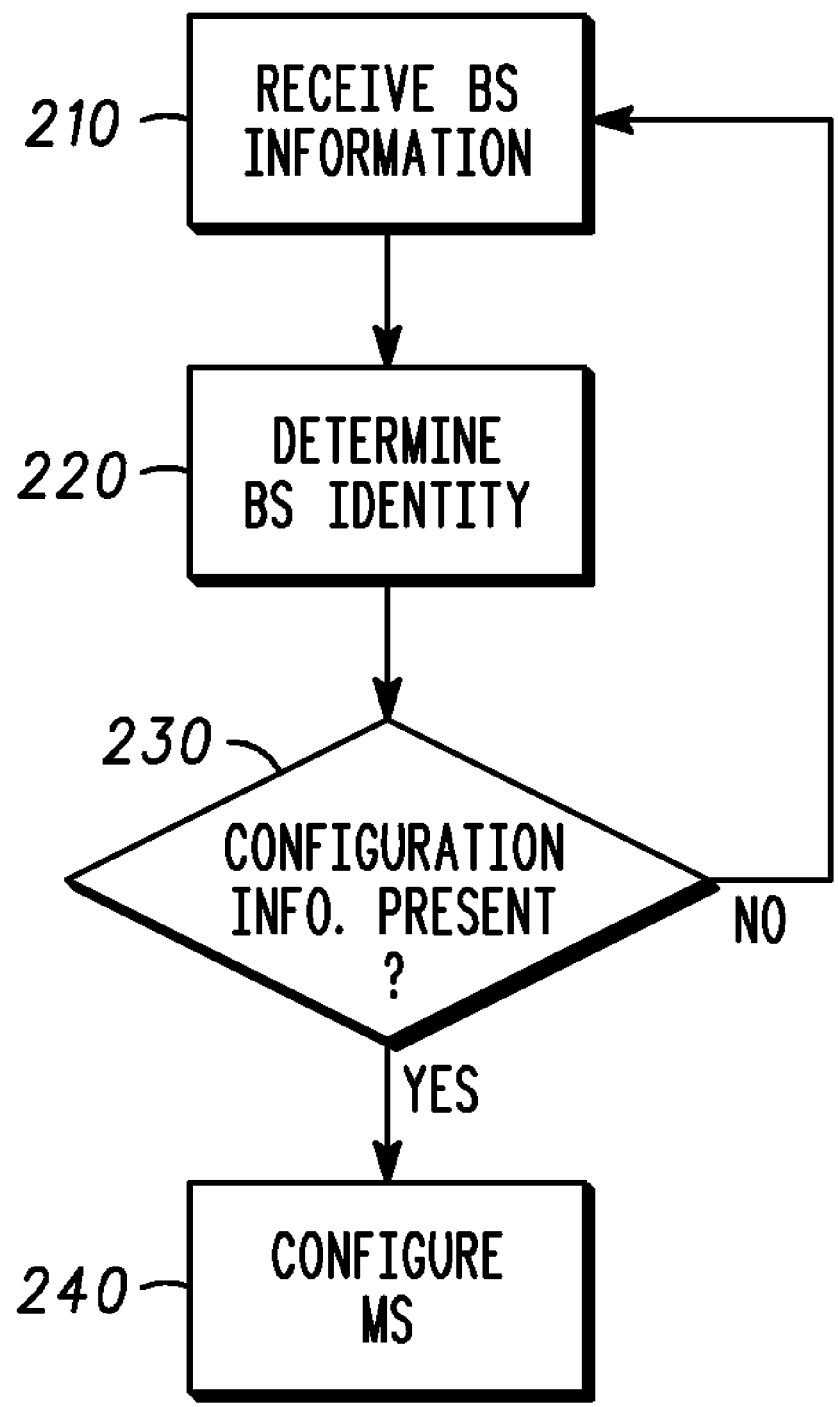
FIG. 2 is an exemplary process flow diagram for configuring a mobile wireless communication device.

In FIG. 2, a mobile wireless communications device, or mobile station (MS), receives base station information 210 transmitted from a base station on a communications network broadcast channel. At block 220, the MS determines an identity of the base station transmitting the base station information based upon the information received.

In the exemplary GSM communications network, the base station transmits a series of frequency correction bursts and synchronization channel information on the broadcast control channel (BCCH). In GSM systems, the mobile wireless communications device determines a unique Base Station Identity Code (BSIC) by decoding synchronization burst information. TDMA networks also transmit synchronization and frequency correction information from which the base station identity may be obtained. In W-CDMA communications networks, the MS identifies the base station by determining a cell downlink scrambling code of the base station.

The MS receives neighbor cell allocation information identifying neighboring base stations or other signal sources that the MS should monitor. The neighbor cell allocation information is usually transmitted from the base station of the cell on which the MS is currently camped, i.e., not actively engaged in communications with the network, but synchronized to a "serving cell" over which a paging signal would be sent in the event that an incoming call is intended for the mobile station. Different communications protocols identify the neighbor cell allocation information differently, and the structure of the information provided varies. The MS generally ignores network broadcast information from base stations not included in the neighbor cell allocation information.

In one embodiment of the disclosure, the MS is configured when the MS enters a region based upon the network broadcast information sent from a base station. In some embodiments the MS configuration reverts to a prior configuration when the MS exits the region, although it may also assume a configuration different than the prior configuration. The region may include one or more base station cells. In a preferred embodiment, the MS is configured when the MS enters a sub-region of a cell where the network broadcast message is transmitted by a base station on which the MS is not camped, but is within receiving range of the MS, as discussed more fully below. Sub-regions include areas smaller than cellular areas, although the sub-region may overlap more than one cellular area, for example where the sub-region is on cellular boundary. In some applications the MS will be configured based upon MS configuration information or instructions associated with a base-station identification for one base station without reselecting to that base station, for example while the MS is camping or camped on another base station.

In one embodiment, entry into a region or a sub-region occurs when the MS receives base station information from which a base station identity may be obtained for a base station on a neighbor cell allocation list. Departure from a region or sub-region occurs when the MS no longer receives the base station information with sufficient power to monitor the base station information. The MS also may be considered to enter into or depart from a region without physically moving upon addition of the base station to or removal thereof from neighbor cell allocation information, which will prompt the MS to either begin monitoring or to stop monitoring the base station transmissions, assuming that the MS is within range of the base station signal at the time it is added to or removed from the neighbor cell allocation information.

In FIG. 2, at block 230, a determination is made whether MS configuration information has been associated with a base station monitored by the MS, for example by comparison of the identities of monitored base stations with a list of base station identities associated with MS configuration information. In FIG. 2, at block 240, the MS is configured according to configuration information associated with a base station included in the neighbor cell allocation information. Exemplary schemes for associating the base stations monitored by the MS with configuration information and schemes for communicating configuration information to the MS are discussed further below.

In one application, an alert mode configuration of the MS is configured when the MS enters a particular region, and the MS is reconfigured when the MS depart the region. In one particular embodiment, for example, the alert mode changes from an audio alert to vibrate alert. In another particular embodiment, the audio volume is changed when the MS enters or exits a particular region. In other embodiments, the mobile wireless communications device may be disabled upon entering into or departing from a region. More generally, the MS may be configured in any way, depending upon the specified configuration associated with the base station and mutually known and supported by the mobile station, examples of which are discussed further below. Exemplary MS configurations include MS operating mode configurations, MS application software operation and configurations, displaying or playing information at the MS, for example, visual advertisements and the use of service provider chimes in connection with outbound calls, etc.

In FIG. 1, in one embodiment, the cellular communications network comprises an assisting base station (ABS) 130 that transmits network broadcast information at least sufficient for the MS to determine the identity of the assisting base station, and in some embodiments without sufficient information to enable the MS to camp on the assisting base station. The assisting base stations preferably transmit pre-synchronization information on a network broadcast channel from which a unique identity of the assisting base station may be determined, for example by mobile stations receiving the pre-synchronization information.

The assisting base station preferably has a unique identity, for example, a GSM Base Station Identity Code (BSIC). In the exemplary GSM communications network, the pre-synchronization information includes the Frequency Correction Channel (FCCH) and Synchronization Channel (SCH), which correspond to time slots 0 and 1 of the Common Control Channel (CCCH) in GSM, on which the Base Station Identity Code (BSIC) is encoded. In one embodiment, information for the assisting base station is included on a neighbor cell allocation list sent by the network when it is desirable for mobile stations to monitor the assisting base station, as discussed below. In GSM communications systems, the allocation information is known as the Broadcast Control Channel allocation list (a.k.a. BA-list).

When the MS receives and identifies base station information from an assisting base station, the MS is configured according to mobile wireless communications device configuration information, otherwise referred to as configuration information or configuration instructions, associated with the assisting base station, in many applications without reselecting to the assisting base station. In some embodiments, a unique identity of the assisting base is associated with the configuration information. The MS is usually reconfigured with the configuration information associated with the assisting base station while camped or camping on a different base station, since it is generally unnecessary, and in a preferred embodiment undesirable, for the MS to camp on, or reselect to, the assisting base station.

The MS is reconfigured only when the base station associated with the configuration information is on the neighbor cell list, provided that the MS is within receiving range and monitors the network broadcast information transmitted by the assisting base station associated with the configuration information. The MS is reconfigured when the assisting base station specifying the configuration information is removed from the neighbor cell list, or when the MS moves beyond the transmission range of the assisting base station, for example when the assisting base station signal strength is too low for the MS to monitor the assisting base station.

The assisting base station is preferably inexpensive and dimensionally small. In many applications, the assisting base station has relatively low power output and is capable of limited coverage, but in other embodiments it may have high power for transmission over large areas. In some embodiments, the assisting base station transmission power is adjustable, for example from the network or by the user or a third party as discussed further below. In some embodiments, the assisting base station can also be turned ON and OFF, for example from the network or by the user or by a third party, although in other embodiments the assisting base station transmits at all times.

The inclusion of the assisting base station on the neighbor cell allocation list prompts the MS to monitor the network broadcast information transmitted by the assisting base station as discussed above. Thus in at least some applications, the assisting base stations do not require a network receiver, although some other receiver may be disposed thereon for remote power level control or ON/OFF control.

The assisting base station may be located in buildings and other areas to permit the building owner to control the configuration of any MS within a specified range of the assisting base station. The network broadcast frequency transmitted by the assisting base station is preferably licensed and assigned by the communications network operator. The assisting base station is preferably installed and operated by the cellular operator, pursuant to the customer's instructions depending upon where it is desirable to control MS operation, as discussed further below. Thus are no issues in most countries as to who is legally entitled to operate on the assisting base station broadcast frequency.

In some embodiments, MS configuration information associated with unique assisting base station identity information is stored on the MS. This information may be downloaded from the network or otherwise provided by a service provider. In operation, the MS cross references the identities of monitored base stations with base station information stored on the MS to determine whether the MS should be reconfigured. The MS is thus configured pursuant to any configuration information stored on the MS in association with the identity of the monitored base station, for example an assisting base station. In applications where the MS monitors more than one base station with configuration information associated therewith, priority information stored on the MS may be used to determine which configuration information has priority where conflicts arise.

In another alternative embodiment, configuration information or instructions are provided to the MS by the network. In this embodiment, the MS communicates the identities of at least the monitored base stations known to be associated with MS configuration information to the network, and the network transmits any corresponding configuration information to the MS. The MS may have stored thereon a list of base station identities, including any assisting base stations, for which MS configuration information is associated at the network, thus enabling the MS to transmit only those base station identities for which configuration information is associated. In this embodiment, the MS configuration information originates from the network, thus eliminating the need to store configuration information for each assisting base station on the MS.

Figure 3:
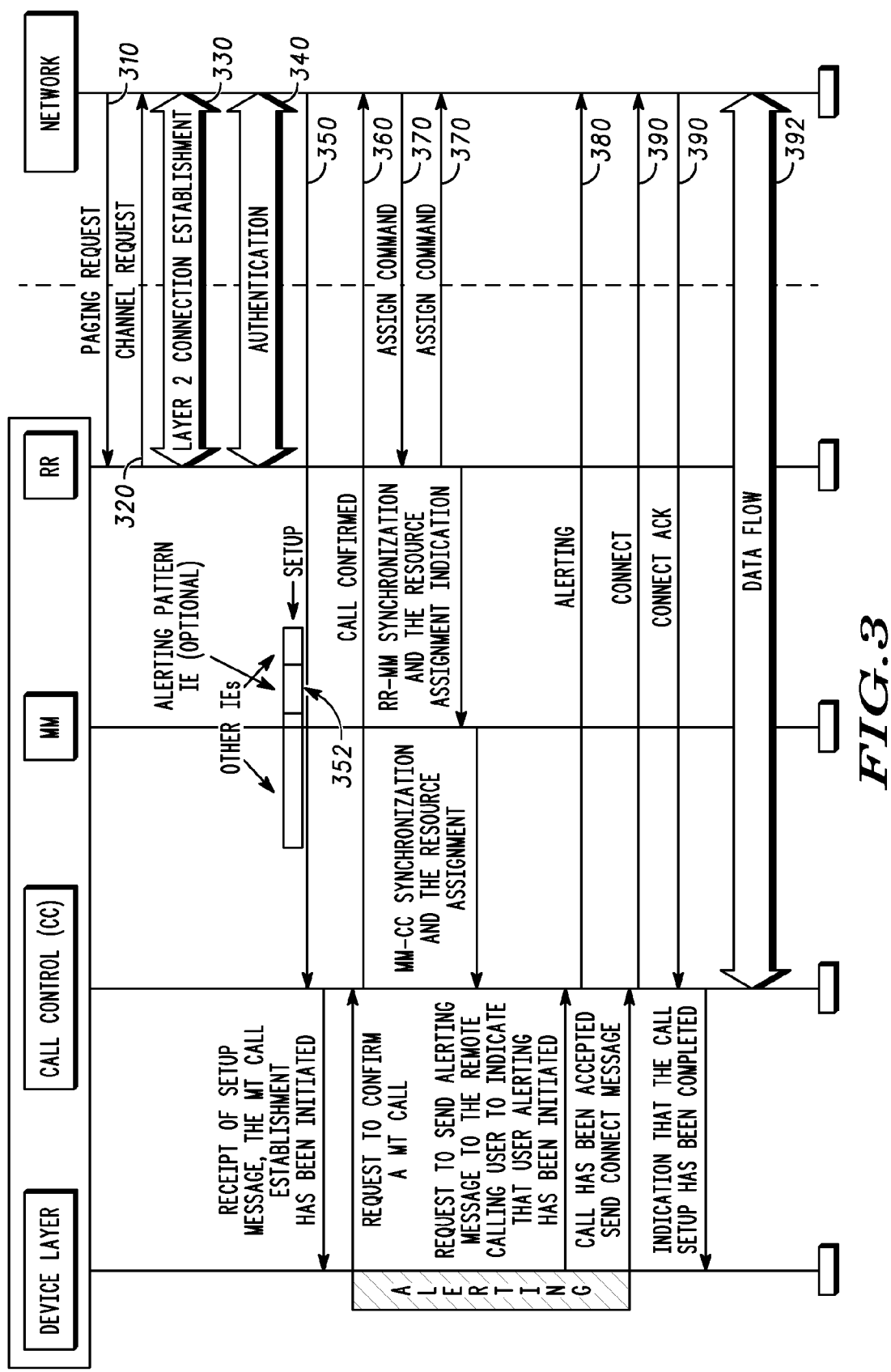
FIG. 3 is an exemplary communications protocol between a network and a mobile wireless communications device.

In the exemplary GSM communications network, in FIG. 3, the network sends a paging request to the MS at step 310. In an MS terminated call, the MS responds with a channel request 320 sent on the Random Access Channel (RACH). A dedicated control channel (Layer 2) connection is established 330 and MS authentication 340 occurs prior to call setup 350.

In one exemplary embodiment, which is suitable for GSM communications network implementations, MS configuration information is transmitted from the network to the MS in a setup message 352. The base station identities for which configuration information may be requested from the network may be sent to the network with the MS channel request or during some other communication prior to call setup. Alternatively, the network may transmit the configuration information via some other message or communication.

FIG. 3 also illustrates other communications between the network and MS occurring after call setup, including call confirmation 360, assigning 370, alerting 380, connecting and acknowledgement 390, and data exchange 392.

Figure 4:
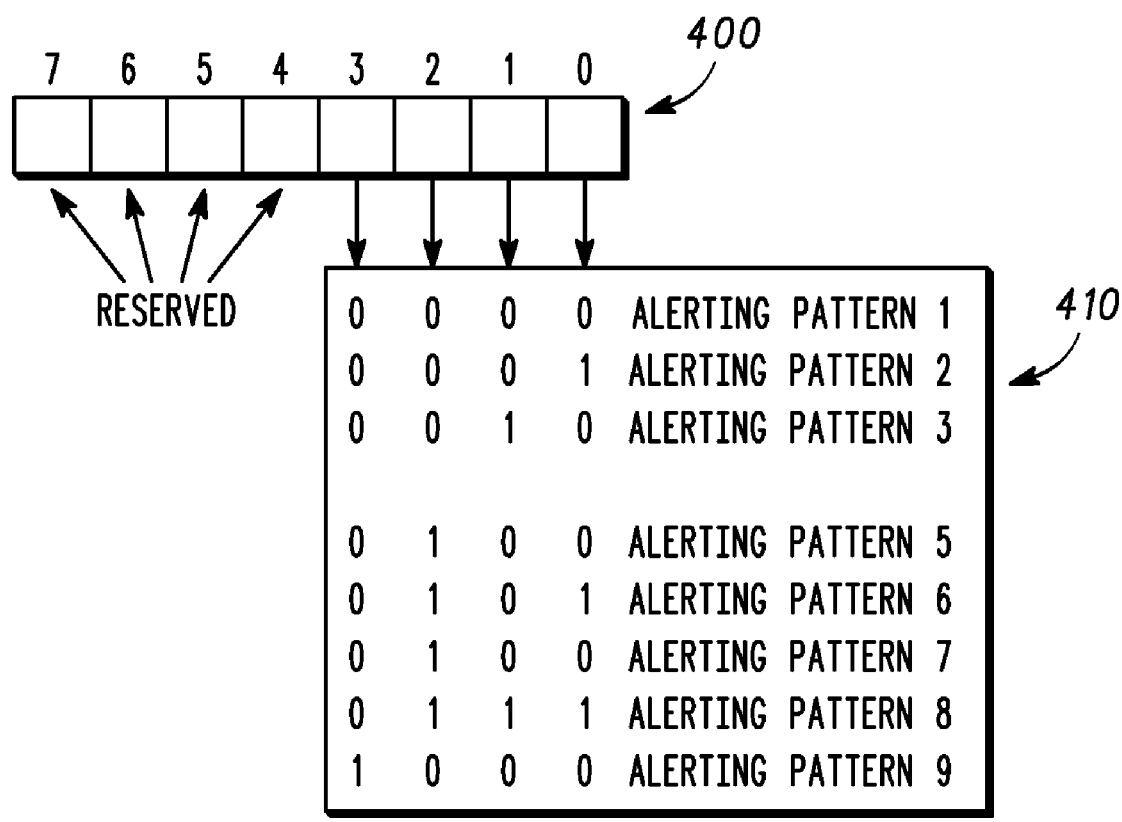
FIG. 4 is an exemplary call setup message including encoded mobile wireless communications device configuration information.

FIG. 4 illustrates an 8-bit portion 400 of an exemplary call setup message, which may be encoded by setting bits for a particular MS configuration. Table 410 illustrates several MS alert modes that may be configured with different bit combinations, which are recognized by the MS as instructions for corresponding alerting patterns. Other schemes with more or less bits may also be implemented. In other embodiments, the bits may correspond to configurations other than alert mode. According to the exemplary embodiment, the MS includes software to interpret or decode the configuration information encoded in the set up message and to implement the encoded configuration on the MS.

In one embodiment, a user accessible MS configuration control server is coupled to the base station subsystem to enable a user or MS configuration control subscriber to establish the MS configuration control over MS activity in a specified area, for example via a user accessible website. The user is, for example, a museum curator, librarian, theater custodian, church official, hospital administrator, airline personnel, etc., desirous of controlling the operation of MS in a localized area, which is within the transmission range of one or more assisting base stations. In the exemplary GSM communications network implementation of FIG. 1, for example, an AC HTTP server 140 and control support gateway (CSG) 142 are coupled to the BSS 110 by the MSC/VLR 114 and a control center (CC) 150. Users generally access the server 140 remotely over the Internet or some other network or by a dial up access.

Figure 5:
FIG. 5 is an exemplary user interface website for controlling mobile wireless communications device alert mode configuration according to an exemplary application of the disclosure.

In FIG. 5, an exemplary alert control website 500 includes multiple fields 510 for authenticating the user, including for example name, address, pass-code, etc. A date field 520 permits the user to specify a date or series of dates during which MS alert function will be controlled, and fields 530 permit the user to specify corresponding times, for example during a theatrical performance schedule between 7:00 and 10:00 pm. Other user interfaces may be different, for example in hospitals and in other environments where it is desirable to disable the MS at all times. Alternatively, this information may be provided to the network operator manually. It may also be scheduled over longer time periods.

In one embodiment, the network enables the assisting base station by including its unique identity on the neighbor cell allocation list, for example during control time periods specified by the user, thus instructing mobile stations to monitor the assisting base station during that time period. In FIG. 1, the information received from the user 102 by the AC HTTP server is communicated to the MSC/VLR 114 via the Control System Gateway (CSG) 142. The MSC/VLR 114 delivers the control request to the BSS 110 to include the corresponding assisting base station information with the neighbor cell information.

In some embodiments, the user of this service may select or control the range over which MS configuration is controlled. The range may be controlled by enabling multiple assisting base stations and/or by varying the transmission power of the assisting base stations. In FIG. 5, the user interface includes a range selection input 540, which allows the user to specify a range over which the MS will be controlled. The exemplary inputs are based upon a radial distance range from the assisting base station, but other embodiments may be based upon some other indicia, for example by identifying building or rooms or floors over which control is desired.

In FIG. 1, the assisting base station 130 may be controlled by the network, for example, the BSS 110, or by a third party 144, or directly by the user, for example a building manager. The user may desire to disable transmission by one or more assisting base stations during periods when the building is closed to reduce power consumption. In other embodiments, the assisting base stations transmit at all times, and thus it is not necessary for the assisting bases station to be coupled to the network or server. The assisting bases station transmission power may also be controlled by any one of these entities.

Assisting base stations may also be useful for locating a MS inside buildings, where other location schemes, for example GPS, triangulation methods, etc. are sometimes unable to locate an MS. Particularly, the network will be able to locate the MS upon receiving the unique identity of the assisting base station from the MS. According to this scheme, low cost assisting bases stations with unique identities could be located throughout an office building, from example one or more on each floor.

While the present disclosures and what is considered presently to be the best modes thereof have been described in a manner that establishes possession thereof by the inventors and that enables those of ordinary skill in the art to make and use the disclosures, it will be understood and appreciated that there are many equivalents to the exemplary embodiments disclosed herein and that myriad modifications and variations may be made thereto without departing from the scope and spirit of the disclosures, which are to be limited not by the exemplary embodiments but by the appended claims.

What is claimed is:

1. A method in a mobile wireless communications device, comprising:
    receiving base station information on a network broadcast channel from a plurality of base stations;
    configuring the mobile wireless communications device according to configuration information associated with a base station without reselecting to the base station associated with the configuration information;
    transmitting an identity of the base station in response to receiving a paging request; and
    receiving a setup message with the configuration information after sending the identity of the base station.

2. The method of claim 1, configuring the mobile wireless communications device according to the configuration information associated with the base station while camping on another base station.

3. The method of claim 1,
    receiving neighbor cell allocation information;
    configuring the mobile wireless communications device according to the configuration information associated with the base station associated with the configuration information only if the base station associated with the configuration information is part of the neighbor cell allocation information.

4. The method of claim 3, reconfiguring the mobile wireless communications device when the base station associated with the configuration information is no longer part of the neighbor cell allocation information.

5. The method of claim 1, at least one of the base stations is an assisting base station,
    receiving neighbor cell allocation information;
    determining an identity of the assisting base station;
    configuring the mobile wireless communications device according to configuration information associated with the assisting base station only if the identity of the assisting base station is part of the neighbor cell allocation information.

6. The method of claim 1, configuring the mobile wireless communications device according to configuration information stored on the mobile wireless communications device in association with an identity of the base station.

7. The method of claim 1, configuring the mobile wireless communications device by configuring an alert mode of the mobile wireless communications device.

* * * * *